(12) United States Patent
Duggan et al.

(10) Patent No.: US 8,549,124 B2
(45) Date of Patent: Oct. 1, 2013

(54) NETWORK MANAGEMENT DISCOVERY TOOL

(75) Inventors: Matthew Edward Duggan, Surrey (GB); Daniel Joseph Martin, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 12/690,602

(22) Filed: Jan. 20, 2010

(65) Prior Publication Data

US 2010/0306360 A1 Dec. 2, 2010

(30) Foreign Application Priority Data

May 27, 2009 (GB) .................................. 09161261.4

(51) Int. Cl.
- *G06F 11/00* (2006.01)
- *G06F 15/173* (2006.01)
- *G06F 15/16* (2006.01)
- *G06F 3/00* (2006.01)

(52) U.S. Cl.
USPC ........... 709/223; 370/229; 370/235; 370/238; 370/244; 370/248; 370/254; 370/310; 370/316; 370/338; 370/351; 370/352; 370/389; 370/392; 370/396; 370/399; 709/226; 709/227; 709/235; 709/238; 709/241; 710/36

(58) Field of Classification Search
None
See application file for complete search history.

(56) References Cited

U.S. PATENT DOCUMENTS

| | | | |
|---|---|---|---|
| 6,393,486 B1 * | 5/2002 | Pelavin et al. | 709/238 |
| 6,580,715 B1 * | 6/2003 | Bare | 370/396 |
| 6,628,670 B1 * | 9/2003 | Galand et al. | 370/468 |
| 6,697,338 B1 | 2/2004 | Breitbart et al. | |
| 7,113,796 B2 * | 9/2006 | Zhang et al. | |
| 7,159,035 B2 * | 1/2007 | Garcia-Luna-Aceves et al. | 709/241 |
| 7,317,692 B2 | 1/2008 | Jason, Jr. et al. | |
| 7,319,677 B2 | 1/2008 | Quist et al. | |
| 7,720,016 B2 * | 5/2010 | Tsang et al. | 370/310 |
| 7,760,735 B1 * | 7/2010 | Chen et al. | 370/392 |
| 8,099,425 B2 * | 1/2012 | Groenendaal et al. | 707/760 |
| 2001/0004745 A1 * | 6/2001 | Villalpando | 709/223 |
| 2002/0036987 A1 * | 3/2002 | Garcia-Luna-Aceves et al. | 370/238 |
| 2002/0061001 A1 * | 5/2002 | Garcia-Luna-Aceves et al. | 370/338 |
| 2002/0080775 A1 * | 6/2002 | Engbersen et al. | 370/352 |
| 2002/0181402 A1 * | 12/2002 | Lemoff et al. | 370/238 |
| 2003/0145246 A1 * | 7/2003 | Suemura | 714/2 |
| 2003/0147352 A1 * | 8/2003 | Ishibashi et al. | 370/248 |
| 2003/0179707 A1 * | 9/2003 | Bare | 370/235 |
| 2003/0204616 A1 * | 10/2003 | Billhartz et al. | 709/235 |
| 2003/0235153 A1 * | 12/2003 | Lee et al. | 370/229 |

(Continued)

*Primary Examiner* — Moustafa M Meky
*Assistant Examiner* — Ho Shiu
(74) *Attorney, Agent, or Firm* — Nelson and Nelson; Daniel P. Nelson; Alexis V. Nelson (57) ABSTRACT

A method, apparatus, and computer program product for discovering network paths between network devices in a distance-vector network are provided. The method may include providing a node model of network devices in a distance-vector network. The node model may include a network address corresponding to a network device. The network address may be used to query the network device for routing information. This routing information may be used to identify another network address corresponding to a second network device, and to identify a path from the first network device to the second network device. These devices and the path therebetween may be mapped in the node model. Finally, the second network device may be queried for subsequent routing information to identify and map subsequent devices and paths.

20 Claims, 6 Drawing Sheets

(56) References Cited

U.S. PATENT DOCUMENTS

| | | | |
|---|---|---|---|
| 2004/0008687 A1* | 1/2004 | Matsubara | 370/395.21 |
| 2004/0008688 A1* | 1/2004 | Matsubara et al. | 370/395.21 |
| 2004/0025018 A1* | 2/2004 | Haas et al. | 713/168 |
| 2004/0190532 A1* | 9/2004 | Oguchi et al. | 370/399 |
| 2004/0213400 A1* | 10/2004 | Golitsin et al. | 379/265.12 |
| 2005/0010668 A1* | 1/2005 | Chen | 709/227 |
| 2006/0007865 A1* | 1/2006 | White et al. | 370/238 |
| 2006/0031573 A1 | 2/2006 | Feutz et al. | |
| 2006/0075134 A1* | 4/2006 | Aalto et al. | 709/238 |
| 2006/0291446 A1* | 12/2006 | Caldwell et al. | 370/351 |
| 2007/0025253 A1* | 2/2007 | Enstone et al. | 370/235 |
| 2007/0055797 A1* | 3/2007 | Shimozono | 710/36 |
| 2007/0064597 A1* | 3/2007 | Bernick et al. | 370/229 |
| 2007/0118840 A1* | 5/2007 | Amaki et al. | 718/105 |
| 2007/0124477 A1* | 5/2007 | Martin | 709/226 |
| 2007/0171844 A1* | 7/2007 | Loyd et al. | 370/254 |
| 2008/0285739 A1* | 11/2008 | Golitsin et al. | 379/265.09 |
| 2009/0080328 A1* | 3/2009 | Hu et al. | 370/230 |
| 2009/0154391 A1* | 6/2009 | Wittenschlaeger | 370/316 |
| 2009/0296710 A1* | 12/2009 | Agrawal et al. | 370/392 |
| 2010/0061381 A1* | 3/2010 | Sundt et al. | 370/400 |
| 2010/0195635 A1* | 8/2010 | Maeda | 370/338 |
| 2010/0232316 A1* | 9/2010 | Takacs | 370/254 |
| 2011/0019588 A1* | 1/2011 | Boucadair | 370/254 |

* cited by examiner

NETWORK MANAGEMENT DISCOVERY TOOL

RELATED APPLICATIONS

This application claims priority to European Patent Application No. 09161261.4 filed on May 27, 2009 and entitled METHOD AND APPARATUS FOR NETWORK MANAGEMENT DISCOVERY.

BACKGROUND

Network paths are important because businesses rely on information being effectively sent to and received from staff, customers and partners. Network and IT services used to send information depend on the network infrastructure effectively delivering information between points in the network. As a result, knowing how a service is routed through the network facilitates network troubleshooting, verification and auditing tasks.

SUMMARY

Embodiments of the invention have been developed to facilitate network path discovery in a distance-vector network.

In one embodiment of the present invention, a method for discovering network paths between network devices in a distance-vector network is provided. The method may include providing a node model of network devices in a distance-vector network. The node model may include a network address corresponding to a network device. The network address may be used to query the network device for routing information. This routing information may be used to identify another network address corresponding to a second network device, and to identify a path from the first network device to the second network device. These devices and the path between the devices may be mapped in the node model. Finally, the method may include querying the second network device for subsequent routing information to identify and map subsequent devices and paths.

A corresponding apparatus and computer program product are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which.

DETAILED DESCRIPTION OF THE INVENTION

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, system, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In certain embodiments, a routing protocol may provide an interface language between network devices that allows a network device to communicate with other routing devices, to pass on routing information, and to select routing information to a destination device. Examples of such routing protocols are the link-state routing protocol and the distance routing protocol.

In the link-state protocol, each router may construct a map of its local network and calculate the next best hop in the path for every possible destination in the local network. These next best hops for every possible destination in a local network may form a routing table for a particular device. The link-state protocol may require network devices to share connectivity information with all other network devices in a local network. Particularly, destination information may be shared with all other network devices, although routing information may not be shared.

In contrast, the distance routing protocol may require each router to only share such information with neighboring network devices. In this case, routing information may be shared in addition to connectivity information. According to the distance routing protocol, a router may periodically inform neighboring network devices of network changes. In this manner, the distance routing protocol may result in a less complex network with reduced overhead.

Border Gateway Protocol ("BGP") is another exemplary routing protocol and is a type of distance-vector protocol. According to this protocol, a table of IP networks may designate network reachability among autonomous systems ("AS"). BGP may be described as a path vector protocol because it does not use traditional status metrics, but makes routing decisions based on path, network policies and/or rule sets. Within an autonomous system, internal BGP ("iBGP") may be used so that all of the routers of the autonomous system may connect and communicate directly with each other.

In some network paths utilizing the BGP routing protocol, users of iBGP may make use of software loopback interfaces that are independent of any physical port on a given device. If a path retrieval tool follows the BGP adjacencies, no knowledge of the physical ports supporting the path may be retrieved.

In view of the foregoing, it may advantageous in a distance-vector network, and in particular a path vector protocol network such as BGP, to build a network map of all the network devices. It may be further advantageous for network discovery in a path vector protocol network to identify the physical ports that are used to support a given network path, which may use logical sub-interfaces and/or loopback interfaces. Still further, it may be useful to resolve default and gateway-of-last-resort routes.

Another problem with current path retrieval techniques in a distance vector network may be the inability to specify an intermediary 'waypoint' address to verify the operation of an open shortest path first ("OSPF") router, an area border router ("ABR") or an automonomous system boundary router ("ASBR"), for example. In this instance, embodiments of the present invention may be able to find a path from A-to-Z via X.

Another problem that embodiments of the present invention seek to address is that of the user of "out-of-band" management networks, in which a separate physical network is used for management purposes, thereby segregating the management and data paths. This presents special issues for path retrieval purposes as the "next-hop" address from a router toward a given destination cannot be followed.

Yet another issue addressed by embodiments of the present invention is that of efficiently retrieving routing information from a network device to a specified network without retrieving the full routing table from routers.

Yet another issue addressed by embodiments of the present invention is that of providing graphical user interfaces and event management systems with data relating to the path composition such that the path can be visualized in a GUI and the "signal-to-noise" ratio of events with respect to path composition may be improved. That is, if the path composition is known and effectively stored, an event management system may raise alerts "in context" of the path rather than individual components, thus giving operators more useful management information.

Certain embodiments of the present invention seek to address these problems by querying network devices via simple network management protocol ("SNMP"), and by opting for Interior Gateway Routes ("IGR") such as OSPF, in the event that a BGP route is found. Embodiments of the present invention may further resolve physical ports. The user of the present invention may be able to specify a "waypoint" through which a path may be traced, and may perform a path trace in the event that out-of-band management networks are used.

Embodiments of the present invention may effectively retrieve path information from network devices and resolve the path to the physical ports used to support the path. Embodiments may do this in environments using iBGP sessions between software loopback interfaces, as well as in environments where out-of-band management networks are used.

An advantage of embodiments of the present invention is that the user may gain detailed knowledge of the ports that underpin the path and that, as a result, may be the point of management focus.

Figure 1:
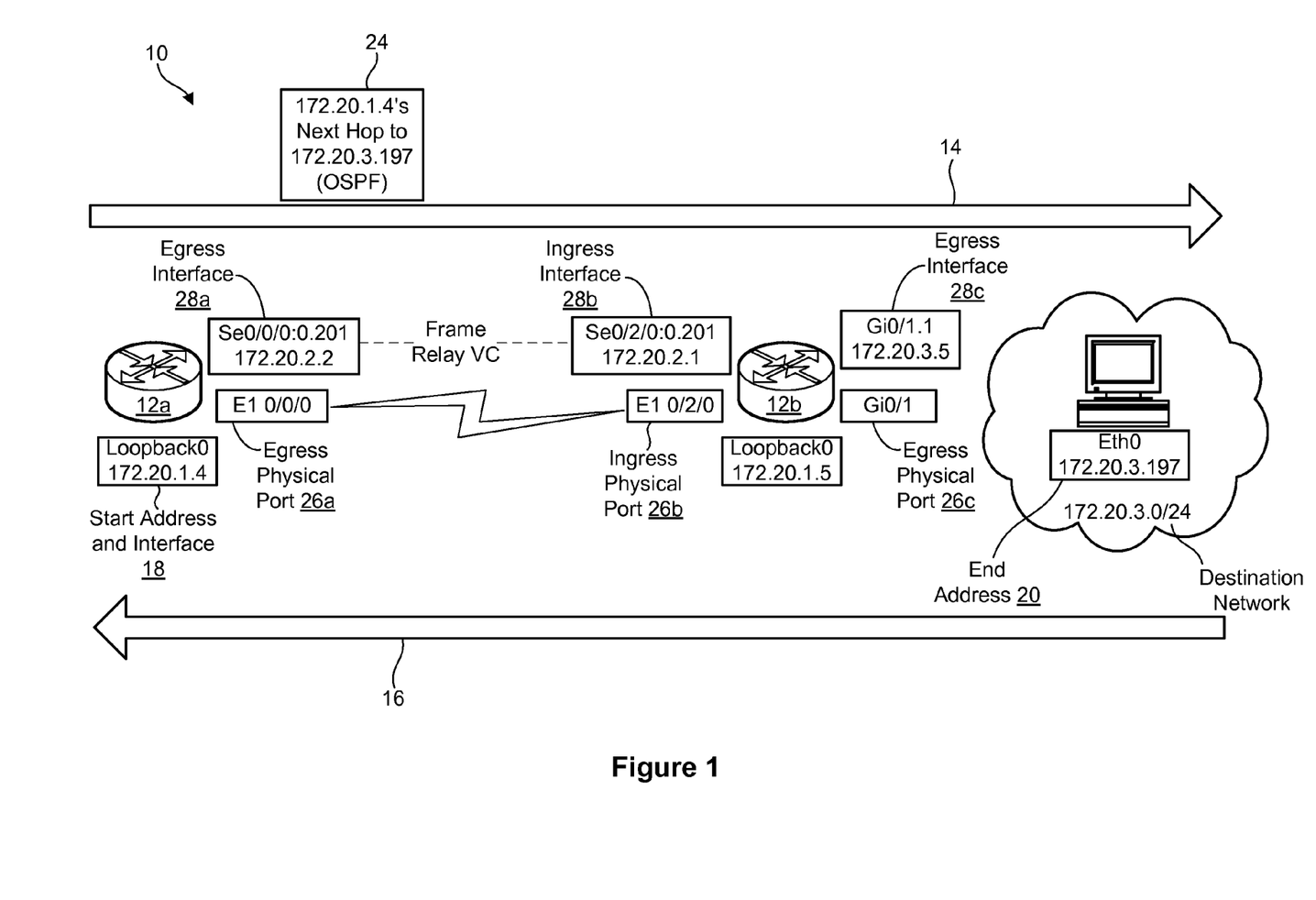
FIG. 1 is a diagram of an exemplary computing network.

FIG. 1 shows components in an exemplary network 10 between two routers 12a, 12b having a forward path 14 and a return path 16. A network path may include a direction (either forward 14 or return 16), a start point 18 and an end point 20 (the destination), and an ordered set of "hops" between the start 18 and end points 20, where each hop relates to a network device port 26 and/or interface 28. Routers 12a, 12b in the network may not have specific routes toward a given destination and, in some cases, may use aggregate routes.

For instance, to reach the host destination 20, a router 12a, 12b may contain a route to the network 22. Each router 12a, 12b along a path may further have some next-hop IP addresses 24 toward the specified destination address or subnet, as well as an associated routing protocol through which the route toward the destination may be established. Paths through the network may change in response to device or interface failures, configuration changes and routing events outside of the network operator's administrative control. Routers 12a, 12b within the network may include a "default route" or gateway of last resort that may be used to route traffic for which no specific route exists.

Figure 2A:
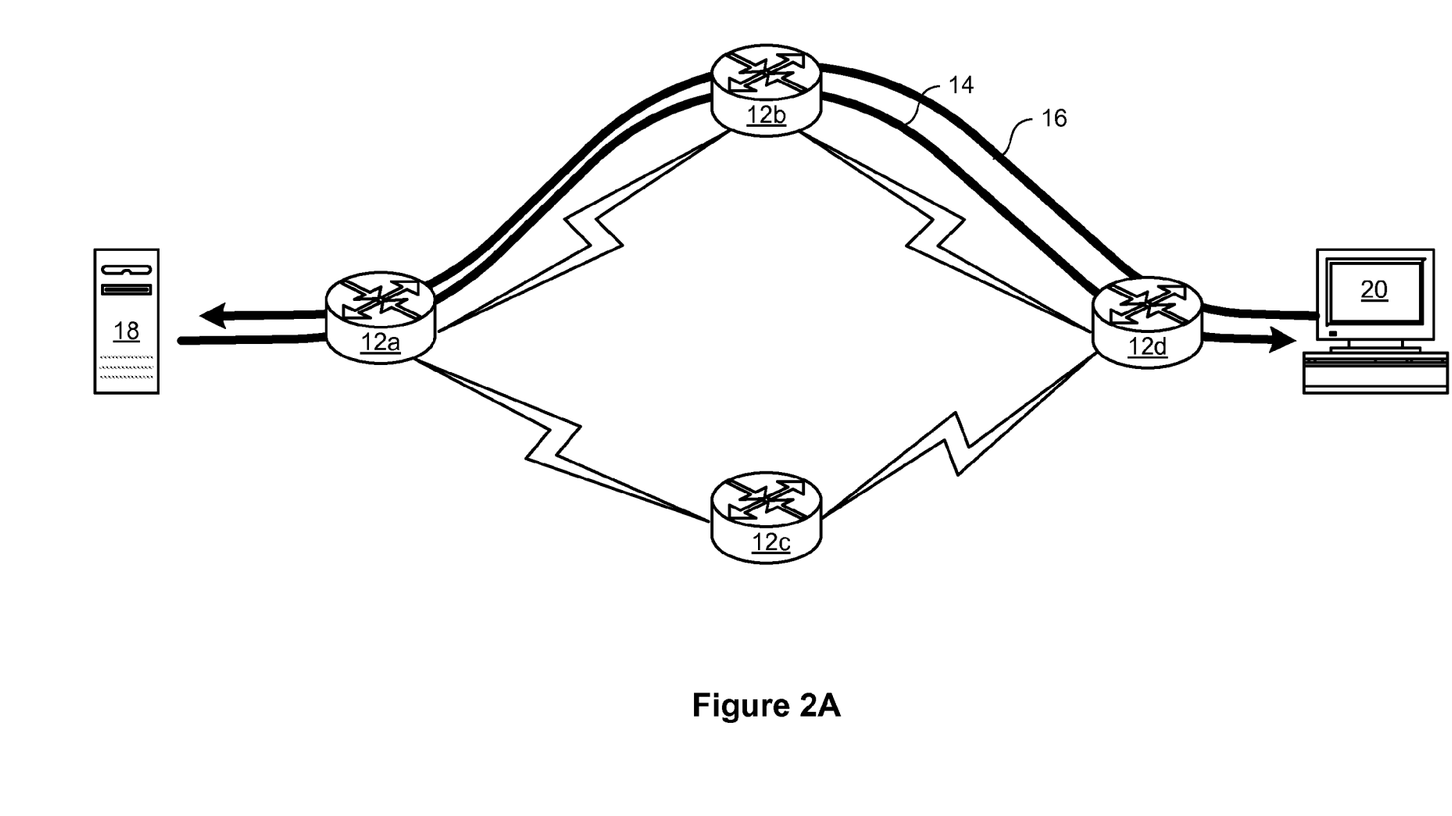
FIGS. 2A, 2B and 2C are network diagrams showing examples of types of networks and paths in accordance with certain embodiments of the invention.
Figure 2B:
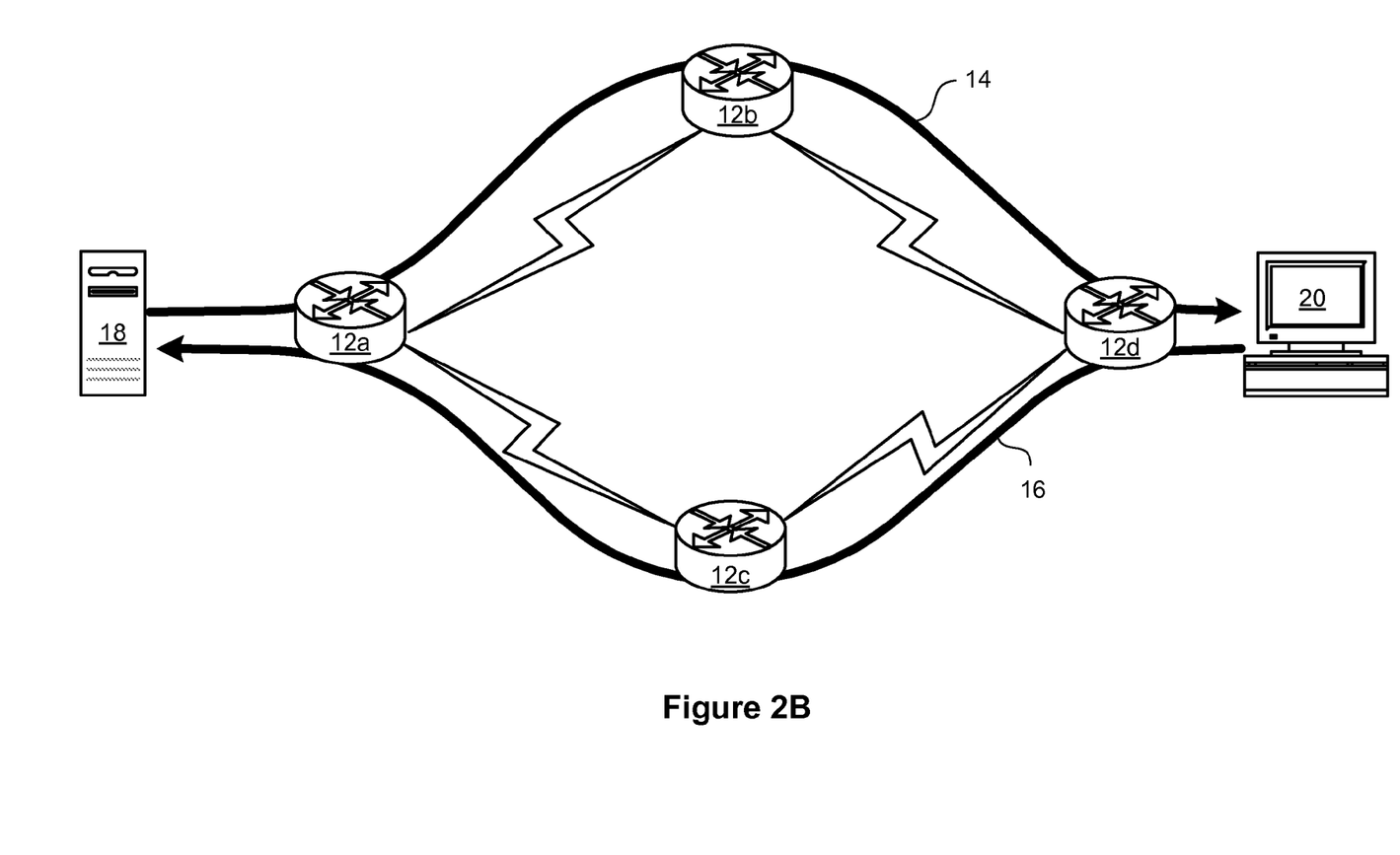
Figure 2C:
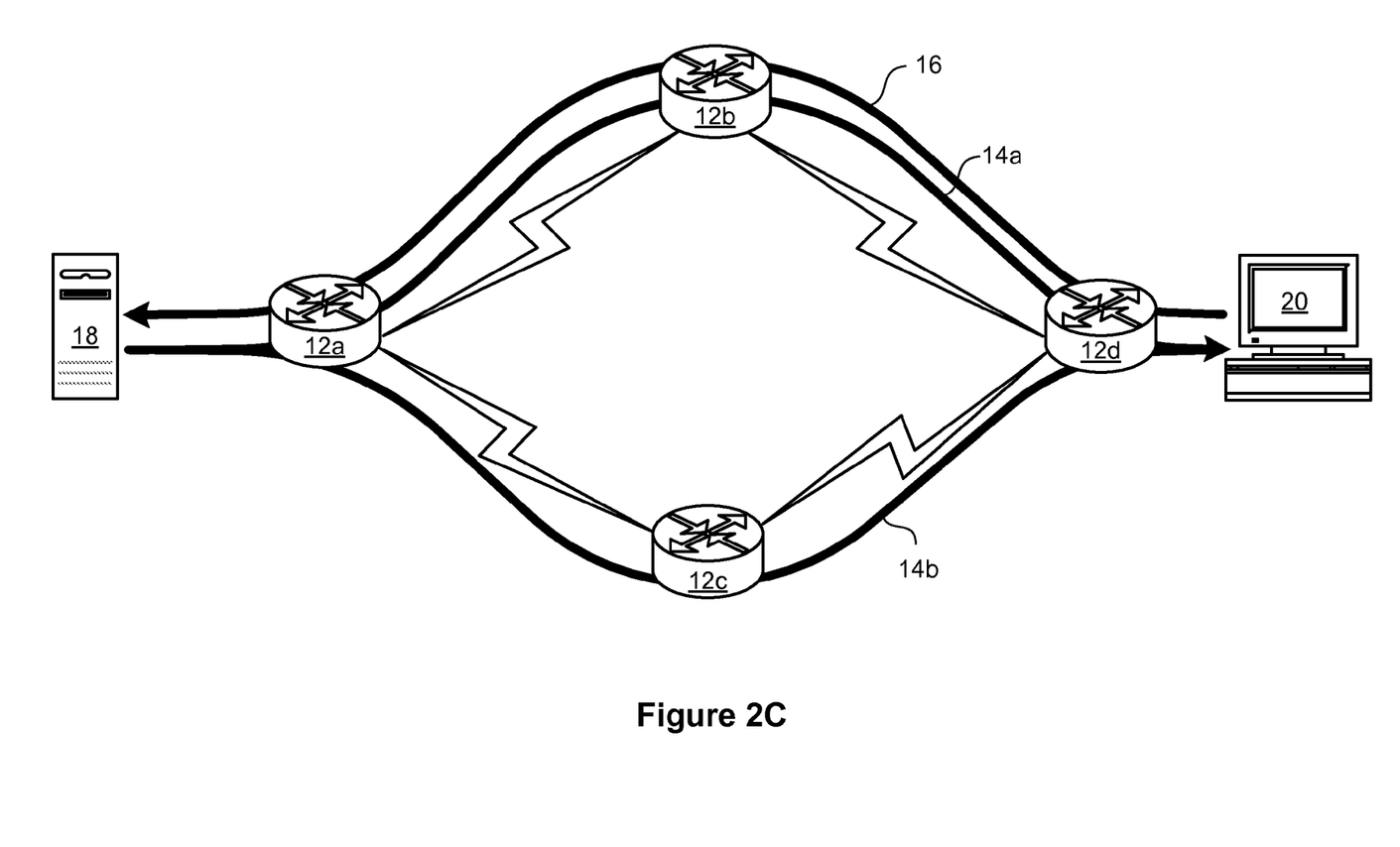

Some network path types are shown in FIGS. 2A, 2B, and 2C. FIG. 2A shows a symmetric network path where the forward and return paths 14, 16 pass through the same network devices (Routers A, B and D). FIG. 2B shows an asymmetric network path where the forward and return paths 14, 16 pass through different network devices, namely, Routers A, B and D on the forward path 14 and Routers A, C and D on the return path 16. FIG. 2C shows a load-balanced/equal cost multiple path ("ECMP") where multiple paths exist between the start 18 and end points 20.

In any case, should one of the interfaces 28 or ports 26 fail or be administratively shut-down, the path may fail or re-route. Network operations staff typically want to retrieve network path information between specified IP addresses either on-demand as part of troubleshooting and verification tasks, or as "managed" objects which the network management system automatically discovers and maintains. A network discovery system may retrieve network path information from network devices.

Figure 3:
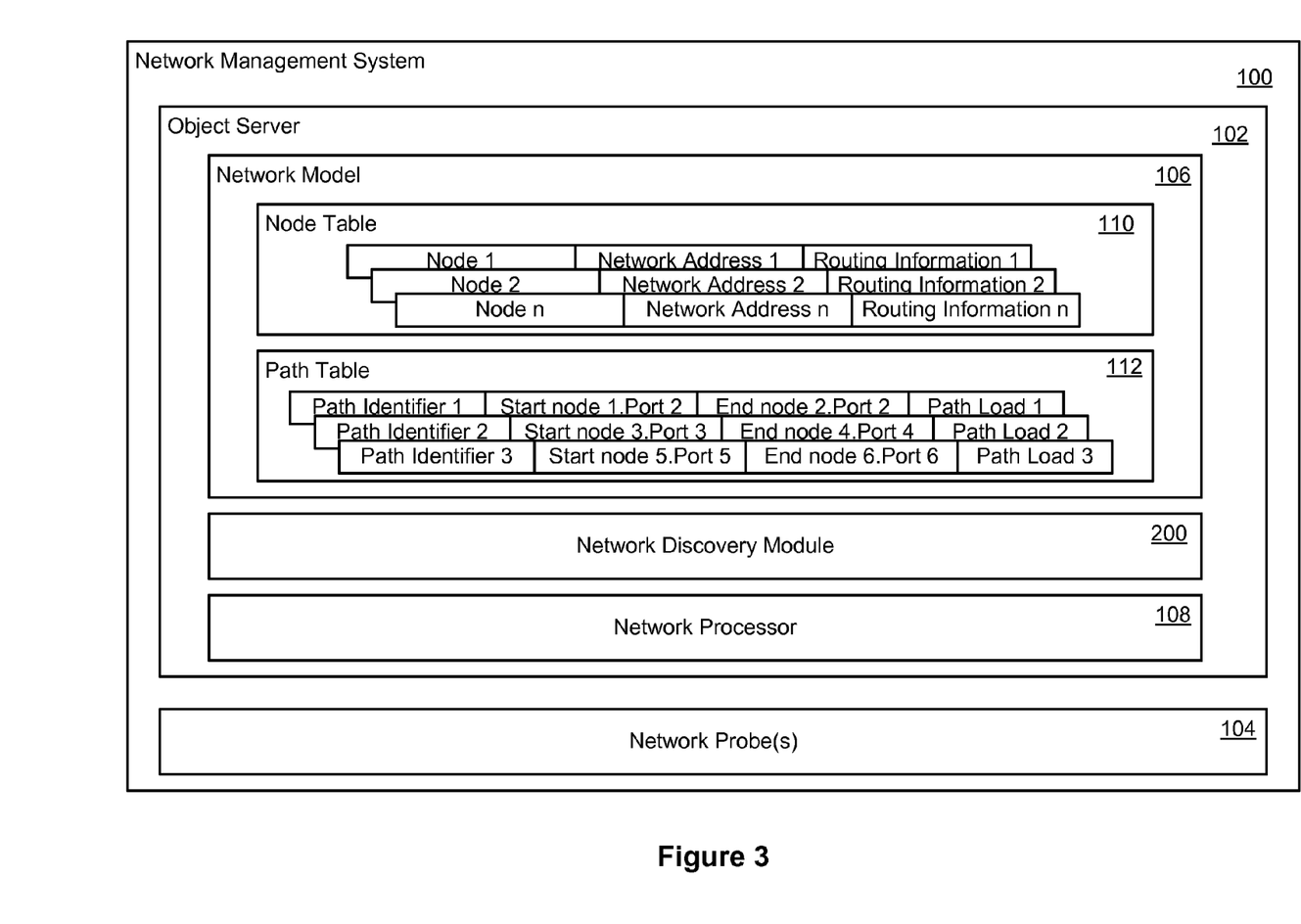
FIG. 3 is a block diagram of a network management system in accordance with certain embodiments of the invention.

FIG. 3 illustrates a network management system 100 in accordance with certain embodiments of the invention. The network management system 100 may include an object server 102 and one or more network probes 104. The object server 102 may include a network model 106, a network discovery module 200, and a network processor 108.

A network model 106 in accordance with certain embodiments may store data for the nodes, network addresses, routing information, paths, ports, loads, and the like. In one embodiment, the network model includes a node table 110 and a path table 112. The node table 110 may contain a record for each node including, for example, a node identifier, a network address, acquired routing information, and the like. The path table 112 may contain a record for each path including, for example, a path identifier, a start node and port, an end node and port, a path load, and the like.

The network discovery module 200 may implement the network discovery method 400 described below with reference to FIG. 4. In certain embodiments, the network processor 108 may include a program execution engine to perform steps of the network discovery method 400.

One or more network probes 104 may communicate with network devices to retrieve information using, for example, Simple Network Management Protocol ("SNMP"). SNMP is a component of the Internet Protocol Suite as defined by the Internet Engineering Task Force ("IETF"), and may be used in network management systems to monitor and control network-attached devices.

Particularly, a network probe 104 may use SNMP to query a network device database, such as a management information base ("MIB"). A MIB may include a collection of objects in a (virtual) database used to manage entities (such as routers and switches) in a network. Each type of network device may require a corresponding type of probe 104 so that the object server 102 may communicate with the network device in its same network device language.

Figure 4:
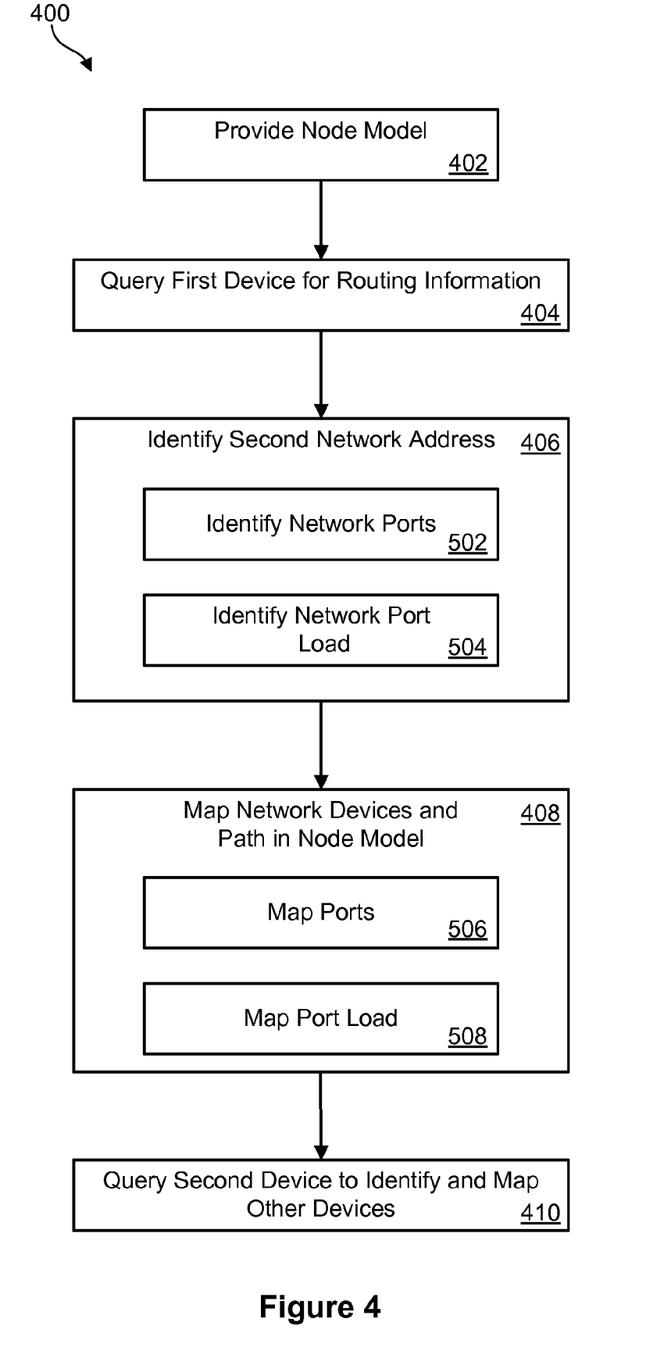
FIG. 4 is a flow chart illustrating a method in accordance with certain embodiments of the invention.

Referring now to FIG. 4, a method 400 for discovering network paths in accordance with certain embodiments is shown. As previously mentioned, a network management system 100 may include and object server 102 configured to perform method steps, as detailed below. In certain embodiments, for example, the network management system 100 may execute a network discovery computer program for discovering network paths between network devices in a distance-vector network. The network discovery computer program, when loaded onto a computer system and executed, may perform a method or process 400 to discover network paths between network devices in a distance-vector network.

In one embodiment, as described below, the method 400 may use a sequential method language. One skilled in the art will recognize, however, that a method 400 in accordance with embodiments of the invention may be described in any computer program language, and the steps of the method 400 may or may not be performed substantially sequentially.

In certain embodiments, a node model of network devices in a distance-vector network may be provided 402. This node model may include a network address of a network device. The network device may be queried 404 for routing information using the network address.

Particularly, a network device may be queried to retrieve routing information in the form of a data structure of "next-hops." The routing information data structure may be constructed by the following structured method:

---

404. Query step
    404.1. let sourceIP = user specified source IP address
    404.2. let destinationIP = user specified destination IP address
    404.3. let viaIP = user specified optional waypoint IP address
    404.4. let currentStep{ sourceIP } = the current step
    404.5. let finishedProcessing = false
    404.6. let visitedVia = false;
    404.7. if viaIP then remember destinationIP; let destinationIP = viaIP
    404.8. while ( ¬ finishedProcessing )

```
    404.9. {       let nextStep = { }
    404.10. foreach node in currentStep{ }
    404.11. {      exit unless node is IP routing and is accessible
       404.11.1.1. let routes{ }=getRoutesToDestination(node, destinationIP)
       404.11.1.2.foreach ascending sorted by CIDR mask route in routes{ }
       404.11.1.3.{   let nextHop = null
          404.11.1.3.1. let candidateBetterRoute=resolveIPToNextHop(node,
route.nextHop)
          404.11.1.3.2. if(candidateBettterRoute and candidateBetterRoute.nextHop !=
'0.0.0.0'
          404.11.1.3.3. and    candidateBetterRoute.protocol  !=   'BGP'     and
candidateBetterRoute.type = 'remote')
          404.11.1.3.4. {      nextHop = candidateBetterRoute.nextHop
          404.11.1.3.5. }
          404.11.1.3.6. else
          404.11.1.3.7. {      nextHop = route.nextHop
          404.11.1.3.8. }
          404.11.1.3.9. if user specified out-of-band, then get the nextHop =
getAccessIPAddress(node, nextHop)
          404.11.1.3.10.let egressInterface = determineEgressInterface(node, route)
          404.11.1.3.11.let ingressInterface = determineInterfaceByAddress(node)
          404.11.1.3.12.store next hop, route, candidate route, ingressInterface,
egressInterface
          404.11.1.3.13.if(route.type != 'local' and nextHop != '0.0.0.0')
          404.11.1.3.14.{         add nextHop to nextStep{ }
          404.11.1.3.15.}
          404.11.1.3.16.else
          404.11.1.3.17.{       if(user specified viaIP and¬ visitedVia)
          404.11.1.3.17.1.      {     recall destinationIP
          404.11.1.3.17.1.1.    visitedVia = true
          404.11.1.3.17.1.2.    add node to nextStep{ }
          404.11.1.3.17.2.}
          404.11.1.3.18. }
       404.11.1.4.}
    404.12.}
    404.13. if no nextStep{ } then finished = true else currentStep{ } = nextStep{ }
404.14.}
```

A second network address corresponding to a second network device, and a path from the first device to the second device, may be identified 406 from the routing information. In certain embodiments, a sub-process step 502 may identify a first and second network port with respect to the path from first device to the second device based on the routing information. In some embodiments, a further sub-process step 504 may identify a first and second network port load with respect to the path based on the routing information.

Referring now to FIG. 4, in some embodiments a method for efficiently determining routes to a specified address may be expressed in pseudocode or as a structured method, for example:

```
406.  Identify destination address and path
    406.1. function getRoutesToDestination(node, destination)
    406.2. {
       406.3. let routes{ } = empty
       406.4. let gotSpecificRoute = false
       406.5. foreach mask in { 255.255.255.255 - 0.0.0.0}
       406.6. {
          406.6.1.1. last if gotSpecificRoute = true
          406.6.1.2. let network = destination & mask
          406.6.1.3. my route = getRouteViaSnmp( ipCidrRouteIfIndex .+
network + mask)
          406.6.1.4. if(route)
          406.6.1.5. {
             406.6.1.5.1.   add route to routes{ }
             406.6.1.5.2.   let gotSpecificRoute = true unless
route.defaultRoute = true
          406.6.1.6.}
       406.7.}
    406.8. return routes{ }
406.9.}
```

Similarly, a method 502 for determining ports may also be expressed in pseudocode or as a structured method, for example:

```
502. Method for determining ports
    502.1. function determineEgressInterface (node, route)
    502.2. {
       502.2.1.1. let interfaces{ } = empty
       502.2.1.2. let ifIndex = route.ifCidrRouteIfIndex or
route.ipRouteIfIndex
       502.2.1.3. let nextHop = route.ipCidrRouteNextHop or
route.ipRouteNextHop
       502.2.1.4. if ifindex
       502.2.1.5. {
          502.2.1.5.1.1. add getInterfaceByIfIndex(node,ifIndex) to
interfaces{ }
       502.2.1.6. }
       502.2.1.7. else
       502.2.1.8 {
          502.2.1.8.1.1. add resolveIPAddressToInterface(node, nextHop)
to interfaces{ }
       502.2.1.9. }
       502.2.1.10. return interfaces{ }
502.3. }
```

In certain embodiments, the first and second network devices may be mapped 408 in substantially the same way as the path between the first and second network devices in the node model. A process 506 may map network device ports corresponding to the path, and the path between the network device ports in the node model. A further process 508 may map the network device port load in the node model.

The identified devices may be counted and the method 400 may loop back to query 410 the second network device to identify and map subsequent network devices. Port process steps 502 and 506 may also be performed for second and subsequent network devices. In some embodiments, load process steps 504 and 508 may also be performed for the second and subsequent network device ports.

In one embodiment, a method to get interface information may involve using an index. In other embodiments, an IP address may be used to get interface information. A structured method to get interfaces using an index may be defined as follows:

```
602.  function getInterfaceByIfIndex(node, ifIndex)
    602.1. {let interface = getInterfaceDataViaSNMP(node, ifIndex)
        602.1.1.1.    if interface.type = loopback, tunnel or null/other
        602.1.1.2.    { return interface
        602.1.1.3.    }
        602.1.1.4.    else
        602.1.1.5.    {          if(interface.connectorPresent = true)
        602.1.1.5.1.1. {          interface.isPhysical = true
        602.1.1.5.1.1.1.          return interface
        602.1.1.5.1.2. }
        602.1.1.5.1.3. else
        602.1.1.5.1.4. {          let lowestedIfIndex =
processInterfaceStack(node,ifIndex)
        602.1.1.5.1.4.1.   let lowestInterface =
getInterfaceByIfIndex(node, lowestIfIndex)
        602.1.1.5.1.4.1.2.    interface.physicalPort = lowestInterface
        602.1.1.5.1.5. }
        602.1.1.6.    }
    602.2. }
```

In some embodiments, a structured method to get interfaces using an IP Address may be defined as:

```
604. function getInterfaceByAddress(node, address)
    604.1. {   let ifIndex = getSnmp(ipAdEntIfIndex + address)
    604.1.1.1.   return getInterfaceByIfIndex(node, ifIndex)
    604.2. }
```

Further embodiments, provided by way of example and not limitation, are set forth below.

Method in logic apparatus embodiment.

It will be clear to one skilled in the art that the method of the present invention may suitably be embodied in a logic apparatus comprising logic means to perform the steps of the method, and that such logic means may comprise hardware components or firmware components.

Logic Array Embodiment.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

Multiple Processor Embodiment.

It will be appreciated that the method described above may also suitably be carried out fully or partially in software running on one or more processors (not shown), and that the software may be provided as a computer program product carried on any suitable data carrier (also not shown), such as a magnetic or optical computer disc. The channels for the transmission of data likewise may include storage media of all descriptions as well as signal carrying media, such as wired or wireless signal media.

Memory and communication technology. Those skilled in the art will appreciate that computer readable instructions may be stored using any memory technology, present or future, including but not limited to, semiconductor, magnetic, or optical, or transmitted using any communications technology, present or future, including but not limited to optical, infrared, or microwave.

Distributable Medium Embodiment.

It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Service Deployment Embodiment.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software may then be downloaded into the client computers that will execute the process software. Alternatively, the process software may be sent directly to the client system via e-mail. The process software may then be either detached to a directory or loaded into a directory by, for example, a button on the e-mail that executes a program that detaches the process software into a directory. Another alternative is to send the process software directly to a directory on the client computer hard drive. When there are proxy servers, the process may select the proxy server code, determine on which computers to place the proxy servers' code, transmit the proxy server code, and install the proxy server code on the proxy computer. The process software may be transmitted to the proxy server code then stored on the proxy server.

Service Integration Embodiment.

The process software may be integrated into a client, server and network environment by providing for the process software to coexist with applications, operating systems and network operating systems software, and installing the process software on the clients and servers in the environment where the process software will function. In some embodiments, any software on the clients and servers may be identified, including the network operating system where the process software will be deployed, and software required by the process software or that works in conjunction with the process software. This may include a network operating system that is software that enhances a basic operating system by adding networking features.

The software applications and version numbers may be identified and compared to the list of software applications and version numbers that have been tested to work with the process software. Those software applications that are missing or that do not match the correct version may be upgraded with the correct version numbers. Program instructions that pass parameters from the process software to the software applications may be checked to ensure the parameter lists match the parameter lists required by the process software. Conversely, parameters passed by the software applications to the process software may be checked to ensure the parameters match the parameters required by the process software.

The client and server operating systems, including the network operating systems, may be identified and compared to the list of operating systems, version numbers and network software that have been tested to work with the process software. Those operating systems, version numbers and network software that do not match the list of tested operating systems and version numbers may be upgraded on the clients and servers to the required level. After ensuring that the software where the process software is to be deployed is at the correct version level that has been tested to work with the process software, integration may completed by installing the process software on the clients and servers.

On Demand Embodiments.

The process software may be shared, simultaneously serving multiple customers in a flexible, automated fashion. It may be standardized, requiring little customization, and, in certain embodiments, may be scalable, providing capacity on demand in a pay-as-you-go model. The process software may be stored on a shared file system accessible from one or more servers.

The process software may be executed on the accessed server via transactions that contain data and server processing requests. Server processing requests may utilize CPU units of time, such as minutes, seconds, and/or hours on the central processor of the server. Additionally, the accessed server may make requests of other servers that require CPU units. CPU units, however, are just one example of a measurement of use. Other measurements of use may include, but are not limited to, network bandwidth, memory usage, storage usage, packet transfers, complete transactions, and the like.

When multiple customers use the same process software application, their transactions may be differentiated by the parameters included in the transactions that identify the unique customer and the type of service for that customer. All of the CPU units and other measurements of use pertaining to the services for each customer may be recorded. When the number of transactions to any one server reaches a number that begins to influence the performance of that server, other servers may be accessed to increase capacity and share the workload. Likewise, when other measurements of use, for example network bandwidth, memory usage, and storage usage, approach a capacity that may influence performance, additional resources may be added to share the workload.

The measurements of use used for each service and customer may be sent to a collecting server that sums the measurements of use for each customer for each service that was processed anywhere in the network of servers that provide the shared execution of the process software. The summed measurements of use may be periodically multiplied by unit costs. The resulting total process software application service costs may be sent to the customer and/or provided on a web site accessible by the customer and configured to remit payment to the service provider.

In one embodiment, the service provider may request payment directly from a customer account at a banking or financial institution. In another embodiment, if the service provider is also a customer of the customer that uses the process software application, the payment owed to the service provider may be reconciled to the payment owed by the service provider, thereby minimizing the transfer of payments.

VPN Embodiments.

In some embodiments, the process software may be deployed, accessed and executed through the use of a virtual private network ("VPN"), which may include any combination of technologies that can be used to secure a connection through an otherwise unsecured network. A VPN may be used to improve security, and for reduced operational costs. The VPN may make use of a public network, usually the Internet, to connect remote sites or users together. Instead of using a dedicated, real-world connection such as leased line, the VPN may utilize "virtual" connections routed through the Internet from the company's private network to the remote site or employee.

Access to the software via a VPN may be provided as a service by specifically constructing the VPN for purposes of delivery or execution of the process software (i.e. the software resides elsewhere). The lifetime of the VPN may be limited to a given period of time, or a given number of deployments based on an amount paid. The process software may be deployed, accessed and executed through, for example, a remote-access or a site-to-site VPN.

In embodiments utilizing a remote-access VPN, the process software may be deployed, accessed and executed via secure, encrypted connections between a company's private network and remote users through a third-party service provider. The enterprise service provider ("ESP") may set a network access server ("NAS") and provide the remote users with desktop client software for their computers. Telecommuters may, for example, dial a toll-free number or attach directly via a cable or DSL modem to reach the NAS and use their VPN client software to access the corporate network, and to access, download and execute the process software.

In embodiments utilizing a site-to-site VPN, the process software may be deployed, accessed and executed through the use of dedicated equipment and large-scale encryption used to connect a company's multiple fixed sites over a public network, such as the Internet. The process software may be transported over the VPN via tunneling, which may involve placing an entire packet within another packet, and sending it over a network. The protocol of the outer packet may be understood by the network and both points or tunnel interfaces where the packet enters and exits the network.

The invention claimed is:

1. A method for building a network map of network devices in a distance-vector network, the method comprising:
  performing the following in an environment using Internal Border Gateway Protocol (iBGP) sessions between software loopback interfaces:
    providing a network model of network devices in a distance-vector network, the network model comprising a first network address corresponding to a first network device;
    querying the first network device for first routing information using the first network address;
    using the first routing information, identifying a second network address corresponding to a second network device and identifying a first path from the first network device to the second network device;
    mapping, in the network model, the first and second network devices and the first path therebetween;
    querying the second network device for second routing information to identify and map subsequent devices and paths; and
    building, as part of the network model, a node table and a path table, the node table identifying each node in the distance-vector network, and the path table identifying each path in the distance-vector network including physical device ports associated with each path.

2. The method of claim 1, further comprising:
  identifying, based on the first routing information, first and second physical device ports corresponding to the first path; and mapping, in the network model, the first and second physical device ports.

3. The method of claim 2, further comprising iteratively identifying and mapping subsequent physical device ports and paths.

4. The method of claim 2, further comprising:
identifying, based on the first routing information, first and second physical device port loads corresponding to the first path; and
mapping, in the network model, the first and second physical device port loads.

5. The method of claim 4, further comprising iteratively identifying and mapping subsequent physical device port loads.

6. The method of claim 1, wherein querying the first network device and querying the second network device comprises communicating with each of the first and second network devices in their network device language.

7. The method of claim 1, wherein each of the first and second routing information comprises a data structure identifying "next-hops."

8. An apparatus for building a network map of network devices in a distance-vector network, the apparatus comprising:
a network management system configured to perform the following in an environment using Internal Border Gateway Protocol (iBGP) sessions between software loopback interfaces:
provide a network model of network devices in a distance vector network, the network model comprising a first network address corresponding to a first network device;
query the first network device for first routing information using the first network address;
using the first routing information, identify a second network address corresponding to a second network device and identify a first path from the first network device to the second network device;
map, in the network model, the first and second network devices and the first path between the first and second network devices;
query the second network device for second routing information to identify and map subsequent devices and paths; and
build, as part of the network model, a node table and a path table, the node table identifying each node in the distance-vector network, and the path table identifying each path in the distance-vector network including physical device ports associated with each path.

9. The apparatus of claim 8, wherein the network management system is further configured to:
identify, based on the first routing information, first and second physical device ports corresponding to the first path; and
map, in the network model, the first and second physical device ports.

10. The apparatus of claim 9, wherein the network management system is further configured to, based on the second routing information, iteratively identify and map subsequent physical device ports.

11. The apparatus of claim 9, wherein the network management system is further configured to:
identify first and second physical device port loads corresponding to the first path; and
map, in the network model, the first and second physical device port loads.

12. The apparatus of claim 11, wherein the network management system is further configured to identify and map subsequent physical device port loads.

13. The apparatus of claim 8, further comprising at least one network probe to enable the network management system to communicate with the first and second network devices in their network device language.

14. The apparatus of claim 8, wherein each of the first and second routing information comprises a data structure identifying "next-hops."

15. A computer program product for building a network map of network devices in a distance-vector network, the computer program product comprising:
a non-transitory computer-readable storage medium having computer-usable program code embodied therein, the computer-usable program code configured to perform the following in an environment using Internal Border Gateway Protocol (iBGP) sessions between software loopback interfaces:
provide a network model of network devices in a distance-vector network, the network model comprising a first network address corresponding to a first network device;
query the first network device for first routing information using the first network address;
using the first routing information, identify a second network address corresponding to a second network device and identify a first path from the first network device to the second network device;
map, in the network model, the first and second network devices and the first path therebetween;
query the second network device for second routing information to identify and map subsequent devices and paths; and
build, as part of the network model, a node table and a path table, the node table identifying each node in the distance-vector network, and the path table identifying each path in the distance-vector network including physical device ports associated with each path.

16. The computer program product of claim 15, further comprising:
computer-usable program code to identify, based on the first routing information, first and second physical device ports corresponding to the first path; and
computer-usable program code to map, in the network model, the first and second physical device ports.

17. The computer program product of claim 16, further comprising computer-usable program code to iteratively identify and map subsequent physical device ports and paths.

18. The computer program product of claim 16, further comprising:
computer-usable program code to identify, based on the first routing information, first and second physical device port loads corresponding to the first path; and
computer-usable program code to map, in the network model, the first and second physical device port loads.

19. The computer program product of claim 18, further comprising computer-usable program code to iteratively identify and map subsequent physical device port loads.

20. The computer program product of claim 15, further comprising computer-usable program code to query each of the first and second network devices in their network device language.

* * * * *